(12) United States Patent
Choi et al.

(10) Patent No.: US 11,366,427 B2
(45) Date of Patent: Jun. 21, 2022

(54) BACKLIGHT UNIT AND HOLOGRAPHIC DISPLAY APPARATUS INCLUDING THE SAME

(71) Applicant: SAMSUNG ELECTRONICS CO., LTD., Suwon-si (KR)

(72) Inventors: Chilsung Choi, Suwon-si (KR); Hoon Song, Yongin-si (KR); Jungkwuen An, Suwon-si (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 16/381,195

(22) Filed: Apr. 11, 2019

(65) Prior Publication Data

US 2020/0150587 A1 May 14, 2020

(30) Foreign Application Priority Data

Nov. 8, 2018 (KR) .......................... 10-2018-0136803

(51) Int. Cl.
*G03H 1/22* (2006.01)
*G02B 30/26* (2020.01)
*F21V 8/00* (2006.01)

(52) U.S. Cl.
CPC ........... *G03H 1/2286* (2013.01); *G02B 6/005* (2013.01); *G02B 6/0016* (2013.01);
(Continued)

(58) Field of Classification Search
CPC ............... G03H 1/2286; G03H 1/2294; G03H 2223/20; G03H 2222/31;
(Continued)

(56) References Cited

U.S. PATENT DOCUMENTS 8,033,706 B1 * 10/2011 Kelly ................ G02F 1/133606
362/607
9,927,571 B2 3/2018 Futterer
(Continued)

FOREIGN PATENT DOCUMENTS

CN 107167925 A 9/2017
CN 107300731 A 10/2017
(Continued)

OTHER PUBLICATIONS

Machine translation of CH 107167925 (Year: 2017).*
(Continued)

*Primary Examiner* — Kimberly N. Kakalec
(74) *Attorney, Agent, or Firm* — Sughrue Mion, PLLC

(57) ABSTRACT

A backlight unit and a holographic display apparatus including the same are provided. The backlight unit includes a light guide plate and a uniformity changing element. The uniformity changing element has a light-incident surface and a light-exiting surface facing the light-incident surface, and the uniformity changing element receives the light output from the light guide plate through the light-incident surface, changes uniformity of the received light from the light guide plate and outputs the received light with the change in the uniformity of the received light through the light-exiting surface.

23 Claims, 15 Drawing Sheets

(52) U.S. Cl.
CPC ......... *G02B 6/0036* (2013.01); *G02B 6/0056* (2013.01); *G02B 30/26* (2020.01); *G03H 1/2294* (2013.01)

(58) Field of Classification Search
CPC ....... G03H 2001/2242; G03H 2223/16; G02B 30/26; G02B 6/0016; G02B 6/0036; G02B 6/005; G02B 6/0056; G02B 17/006; G02B 5/1814; G02B 27/0944; G02B 6/0035; G02B 6/0026; G02B 6/00; G02B 5/32; G02B 27/0081; G02F 1/13; G02F 1/1335

See application file for complete search history.

(56) References Cited

U.S. PATENT DOCUMENTS

| | | | |
|---|---|---|---|
| 10,545,348 B1* | 1/2020 | Lu | ................ G02B 27/0172 |
| 2005/0063173 A1 | 3/2005 | Leu et al. | |
| 2014/0240834 A1 | 8/2014 | Mason | |
| 2015/0086163 A1 | 3/2015 | Valera et al. | |
| 2016/0041387 A1* | 2/2016 | Valera | ................ G02B 27/0081 |
| | | | 385/36 |
| 2016/0065955 A1 | 3/2016 | Kim et al. | |
| 2017/0090089 A1 | 3/2017 | Kim et al. | |
| 2017/0131546 A1 | 5/2017 | Woltman et al. | |
| 2017/0176933 A1 | 6/2017 | Kim et al. | |
| 2018/0136383 A1 | 5/2018 | Choi et al. | |
| 2018/0156962 A1 | 6/2018 | Kim et al. | |
| 2018/0284884 A1 | 10/2018 | Sulai et al. | |
| 2019/0049739 A1 | 2/2019 | Choi et al. | |
| 2019/0064420 A1 | 2/2019 | Lee et al. | |
| 2019/0113761 A1 | 4/2019 | Kim et al. | |
| 2019/0377187 A1* | 12/2019 | Rubin | ................ G02B 27/0081 |

FOREIGN PATENT DOCUMENTS

| | | |
|---|---|---|
| KR | 10-2017-0103206 A | 9/2017 |
| KR | 10-2017-0110345 A | 10/2017 |
| KR | 10-2018-0053030 A | 5/2018 |
| KR | 10-2018-0065421 A | 6/2018 |
| KR | 10-2019-0018344 A | 2/2019 |
| KR | 10-20190023921 A | 3/2019 |
| KR | 10-2019-0041796 A | 4/2019 |
| WO | 2007089073 A1 | 8/2007 |

OTHER PUBLICATIONS

Communication dated Apr. 23, 2020, from the European Patent Office in counterpart European Application No. 19185451.2.
Sergei Slussarenko et al. "Guiding light via geometric phases" Nature Photonics, vol. 10, 2016 (18 pages total).
Imagine Optics "Cutting Edge Optics Technology" Optics Technology Overview, 2019, [retrieved from http://www.imagineoptix.com/technology/] (7 pages total).
Gwanho Yoon et al. "Geometric metasurface enabling polarization independent beam splitting" Scientific Reports, vol. 8, Article No. 9468, 2018 (pp. 1-8).
Michinori Honma et al. "Polarization conversion system with liquid-crystal geometric-phase-based cylindrical lens" Japanese Journal of Applied Physics, 55, 2016 (7 pages total).
Filippus S. Roux "Geometric phase lens" J. Opt. Soc. Am. A, vol. 23, No. 2, Feb. 2006 (7 pages total).
"An Introduction to Polarization Directed Flat Lenses" Edmund Optics Inc. 2016 (16 pages total).
J. P. Balthasar Mueller et al. "Metasurface Polarization Optics: Independent Phase Control of Arbitrary Orthogonal States of Polarization", Physical Review Letters, Mar. 17, 2017 (5 pages total).
Communication dated Sep. 13, 2021 issued by the European Intellectual Property Office in counterpart European Application No. 19 185 451.2.

* cited by examiner

BACKLIGHT UNIT AND HOLOGRAPHIC DISPLAY APPARATUS INCLUDING THE SAME

CROSS-REFERENCE TO RELATED APPLICATION

This application is based on and claims priority from Korean Patent Application No. 10-2018-0136803, filed on Nov. 8, 2018, in the Korean Intellectual Property Office, the disclosure of which is incorporated herein in its entirety by reference.

BACKGROUND

1. Field

Embodiments relate to a backlight unit and a holographic display apparatus including the same, and more particularly, to a backlight unit for reducing image banding and a holographic display apparatus including the backlight unit.

2. Description of the Related Art

As a method of implementing a three-dimensional image, a glasses method and a glasses-free method are widely used. The glasses method is classified as a polarizing glasses method and a shutter glasses method, and the glasses-free method is classified as a lenticular method and a parallax barrier method. These methods use the binocular parallax of the two eyes, which not only limits the increase in the number of viewpoints, but also causes viewers to feel fatigue because the depth perception recognized by the brain does not match with the focus of the eyes.

Recently, as a three-dimensional image display system in which the depth perception recognized by the brain matches with the focus of the eyes and which provides a full parallax, a holographic display method is practically used. The holographic display system operates based on the principle that when reference light is diffracted by irradiating the reference light on a holographic pattern in which interference fringes is obtained by interfering object light reflected from an original object with reference light, an image of the object is regenerated. Currently, according to the holographic display method in practical use, a computer generated hologram (CGH) is used as an electrical signal to a spatial light modulator to obtain a hologram pattern, rather than direct exposing of the original object. According to the input CGH signal, the spatial light modulator forms a hologram pattern and diffracts the reference light so that a three-dimensional image may be generated.

However, to implement a complete holographic display scheme, very high-resolution spatial light modulators and very high data throughput are required. In recent years, in order to alleviate data throughput and resolution conditions, a binocular hologram method has been proposed in which a hologram image is provided only of a view area corresponding to both eyes of an observer. For example, only a hologram image having a viewpoint corresponding to an observer's left eye view area and a hologram image having a viewpoint corresponding to an observer's right eye view area are generated and provided to the observer's left eye and right eye, respectively. In this case, since there is no need to generate hologram images of the remaining viewpoints, the data throughput may be greatly reduced, and even a currently commercialized display device satisfies the resolution condition of the spatial light modulator.

On the other hand, compared with a backlight unit (BLU) used in a liquid crystal display (LCD), BLU used in a holographic display uses highly coherent light. The BLU uses a grating to maintain the coherence of the light emitted from the light pipe. However, in the holographic display apparatus, the light emitted from the light guide plate may cause a banding pattern, which may deteriorate the image quality.

SUMMARY

Provided is a backlight unit providing reduced image banding.

Provided is a holographic display apparatus including a backlight unit providing reduced image banding.

Additional aspects will be set forth in portion in the description which follows and, in part, will be apparent from the description, or may be learned by practice of the presented embodiments.

According to an aspect of the disclosure, there is provided a backlight unit comprising: a light guide plate; an input coupler configured to input light into the light guide plate; an output coupler configured to output the light that has traveled in the light guide plate; and a uniformity changing element having a light-incident surface and a light-exiting surface, and configured to receive the light output from the light guide plate through the light-incident surface; change uniformity of the received light from the light guide plate and output the received light with the change in the uniformity of the received light through the light-exiting surface.

The uniformity changing element maybe further configured to increase the uniformity of the light.

The uniformity changing element maybe further configured to output the light incident on a first location on the light-incident surface through a plurality of different second locations on the light-exiting surface.

The uniformity changing element maybe further configured to propagate the light along a plurality of different light-traveling paths according to polarization of the light inside the uniformity changing element.

The uniformity changing element may comprise a birefringent material.

The uniformity changing element maybe further configured to change the plurality of different light-traveling paths according to an applied electrical signal.

The uniformity changing element may comprise: at least one liquid crystal layer; first electrodes spaced apart from each other and arranged on a first side of the at least one liquid crystal layer; and second electrodes arranged on a second side of the at least one liquid crystal layer and respectively facing the first electrodes, wherein the at least one liquid crystal layer is between the first electrodes and the second electrodes, and wherein the liquid crystal layer may comprise liquid crystals whose refractive index changes according to an electrical signal applied to the corresponding first and second electrodes; and a non-linear material whose pattern changes according to the applied electrical signal.

The backlight unit may further comprise a polarization conversion element configured to convert a plurality of portions of polarized light into single polarized light when the light output from the uniformity changing element comprises the plurality of portions of polarized light.

The uniformity changing element may have a non-uniform thickness.

The light-exiting surface may comprises: a first sub-light-exiting surface being parallel to the light-incident surface and having a first height with respect to the light-incident surface; a second sub-light-exiting surface being parallel to the light-incident surface and having a second height with respect to the light-incident surface, the second height being different from the first height; and a third sub-light-exiting surface connecting the first sub-light-exiting surface with the second sub-light-exiting surface and tilted at an angle with respect to the light-incident surface.

The uniformity changing element maybe further configured to propagate a portion of the light through the first sub-light-exiting surface, and at least a portion of the remainder of the light through the second sub-light-exiting surface.

The third sub-light-exiting surface maybe perpendicular to the light-incident surface.

The light-incident surface may comprises: a first sub-light-incident surface being parallel to the light-exiting surface and having a third height with respect to the light-exiting surface; a second sub-light-incident surface being parallel to the light-exiting surface and having a fourth height with respect to the light-exiting surface, the fourth height being different from the third height; and a third light-incident surface connecting the first sub-light-incident surface with the second sub-light-incident surface and tiled at an angle with respect to the light-exiting surface.

A portion of the light maybe incident on and pass through the first sub-light-incident surface, and at least a portion of the remainder of the light maybe incident on and pass through the second sub-light-incident surface.

The uniformity changing element may comprise: a first uniformity changing element configured to change uniformity of the light into a first level of uniformity and output light having the first level of uniformity; and a second uniformity changing element configured to change the first level of uniformity of the light into a second level of uniformity and output light having the second level of uniformity, the first level of uniformity being different from the second level of uniformity.

The light incident on the input coupler maybe coherent.

When the light incident on the input coupler is spot light, the output coupler may output line light.

According to another aspect of the disclosure, there is provided a holographic display apparatus comprising: a light source configured to emit light; a light guide plate configured to propagate the light from the light source and output the propagated light outside of the light guide plate; a uniformity changing element configured to receive the light output from the light guide plate; change uniformity of light received from the light guide plate and output the received light with the change in the uniformity of the received light; and a spatial light modulator comprising a light-incident surface and a light-exiting surface facing the light-incident surface and configured to diffract light output from the uniformity changing element to generate a holographic image.

The uniformity changing element maybe configured to output the light incident on a first location of the light-incident surface through a plurality of different second locations on the light-exiting surface.

The uniformity changing element may have a non-uniform thickness.

A thickness of the first uniform changing element maybe different from a thickness of the second uniform changing element, A light-exiting surface of the first uniformity changing element maybe a light-incident surface of the second uniformity changing element.

According to another aspect of the disclosure, there is provided a backlight unit comprising: a light guide plate configured to guide light from a light source; an output coupler configured to output the light propagated through the light guide plate; and a uniformity changing element configured to receive the light output from the output coupler; change uniformity of the received light from the output coupler by changing a propagation direction of the received light; and output the received light with the change in the uniformity of the received light.

The uniformity changing element is configured to change a propagation direction of the received light by separating the received light into two or more light refracted light based on polarization characteristics.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
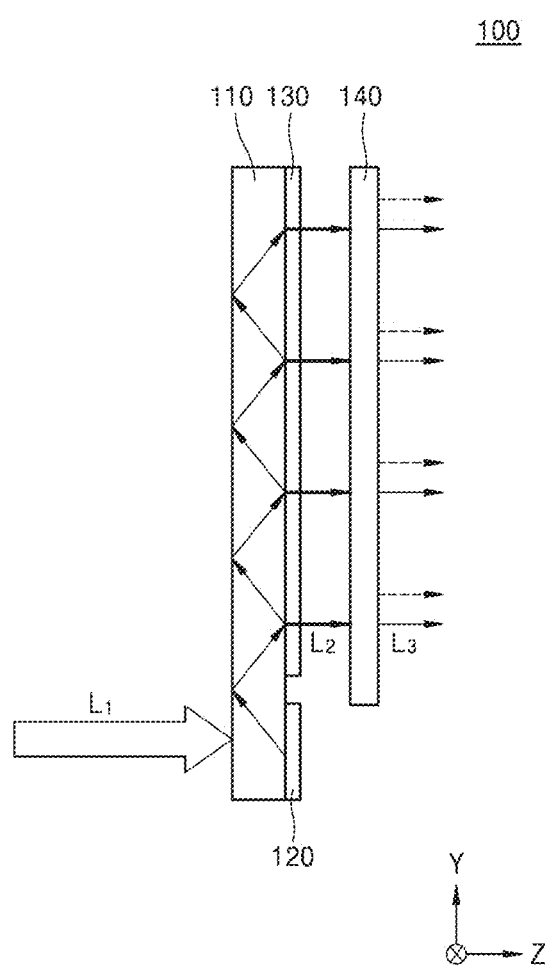
FIG. 1 shows a schematic cross-sectional view of a backlight unit according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a backlight unit according to embodiments and a holographic display apparatus including the same will be described in detail with reference to the accompanying drawings. The width and thickness of the layers or regions illustrated in the accompanying drawings may be somewhat exaggerated for clarity and ease of description. Like reference numerals designate like elements throughout the specification.

As used herein, the term "comprises" or "includes" or the like should not be construed as necessarily including the various elements or operations described in the specification, and some of the elements or operations may not be included, or other elements or operations may be additionally included.

Hereinafter, what is referred to as "above" or "on" may include not only being in contact with the top/bottom/left/right but also those in non-contact with in the top/bottom/left/right. Embodiments are provided herein for illustrative purpose only and will now be made with reference to the accompanying drawings.

The terms first, second, etc. may be used to describe various elements, but the elements should not be limited by terms. Terms are used only for the purpose of distinguishing one component from another.

Also, the terms "part", "module" and the like described in the specification refer to units for processing at least one function or operation, which may be implemented in hardware or software or a combination of hardware and software.

FIG. 1 shows a schematic cross-sectional view of a backlight unit 100 according to an embodiment. Referring to FIG. 1, the backlight unit 100 may include a light guide plate 110 configured to guide incident light $L_1$, an input coupler 120 configured to advance light into the light guide plate 110, an output coupler 130 configured to emit, to the outside of the light guide plate 110, light that has traveled through the light guide plate 110, and a uniformity changing element 140 that adjusts the uniformity of light $L_2$ emitted from the light guide plate 110.

The light guide plate 110 may allow the incident light $L_1$ to travel therein and may emit the adjusted light $L_2$ of which dimension has been changed. For example, when incident light is spot light, the light guide plate 110 may change the spot light into line light and emit the line light. In one or more embodiments, when the incident light is line light, the light guide plate 110 may change the line light into surface light and emit the surface light.

The input coupler 120 may be placed on the light guide plate 110 and advances the incident light $L_1$ into the light guide plate 110. The output coupler 130 may be placed on the light guide plate 110, and may emit, to the outside of the light guide plate 110, the adjusted light $L_2$ that has traveled in the light guide plate 110.

The light guide plate 110 may include a transparent material and may propagate and guide light through total reflection. The incident light $L_1$ incident on the input coupler 120 is diffracted by the input coupler 120 and travels through the light guide plate 110 in the longitudinal direction of the light guide plate 110, for example, along a y-direction. The incident light $L_1$ may be incident on the input coupler 120 vertically or obliquely.

The input coupler 120 is shown placed at the edge of an upper surface of the light guide plate 110, but the position thereof is not limited thereto. The input coupler 120 may be placed under the light guide plate 110. The input coupler 120 may be a diffractive optical element that diffracts and transmits a portion of the incident light $L_1$. For example, the input coupler 120 may have a grating structure.

From among light traveling inside the light guide plate 110, light incident on the output coupler 130 may proceed to the outside of the light guide plate 110. The adjusted light $L_2$ emitted from the output coupler 130 may be enlarged in the longitudinal direction of the light guide plate 110. The output coupler 130, like the input coupler 120, may be a diffractive optical element that diffracts and transmits some of incident light $L_1$. For example, the output coupler 130 may have a grating structure.

The intensity of light incident on the light guide plate 110 is fixed, and the angle of light incident on the light guide plate 110 for beam steering, may be changed. The adjusted light $L_2$ emitted from the light guide plate 110 may have black banding depending on the angle change of the incident light $L_1$ incident on the light guide plate 110. The above-mentioned banding may refer to an instance where no light exists in some areas of the adjusted light $L_2$.

The backlight unit 100 according to an embodiment may further include a uniformity changing element 140 that changes the uniformity of the adjusted light $L_2$ emitted from the light guide plate 110. The uniformity changing element 140 may include a light-incident surface, on which the adjusted light $L_2$ from the light guide plate 110 is incident, and a light-exiting surface 142 through which the incident light, which has traveled in the uniformity changing element 140, is emitted. The light-incident surface and the light-exiting surface may be placed opposite each other. The uniformity changing element 140 may emit the adjusted light $L_2$ incident at one site on the light-incident surface through a different plurality of sites of the light-exiting surface. Thus, the uniformity changing element 140 may change the uniformity of the input light to a high degree of uniformity.

Figure 2:
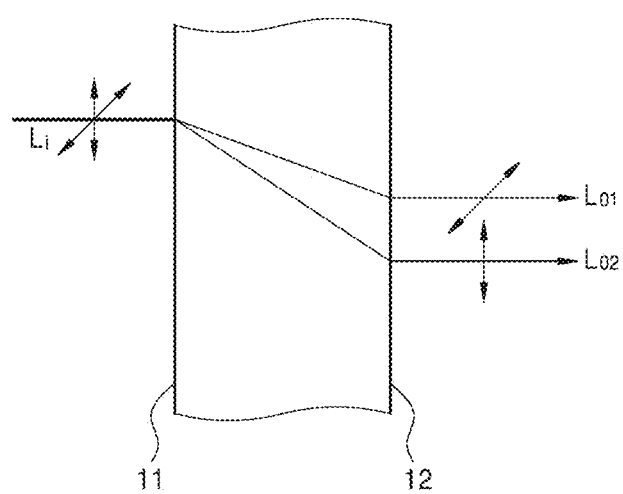
FIG. 2 is a diagram illustrating a light-traveling path in a uniformity changing element according to an embodiment.

FIG. 2 is a diagram illustrating a light-traveling path in a uniformity changing element 140 according to an embodiment. As illustrated in FIG. 2, incident light $L_i$ may be incident through a light-incident surface 11. In the uniformity changing element 140a, the incident light $L_i$ proceeds along a plurality of different light-traveling paths according to polarization characteristics depending on light. Light traveling along different light-traveling paths may be emitted at different sites on the light-exiting surface 12.

The uniformity changing element 140a may include crystals having different refractive indexes depending on a direction. Thus, when the light is incident obliquely with respect to the optical axis of the uniformity changing element 140a, the light is separated into different refracted light according to the polarization characteristic and proceeds along different light-traveling paths. The uniformity changing element 140a may include a birefringent material. For example, the uniformity changing element 140a may include calcite, quartz, tourmaline, mica, arganite, and the like.

Since the incident light $L_i$ incident at one site of the light-incident surface 11 is emitted as a plurality of light $L_{O1}$ and $L_{O2}$ at a plurality of sites of the light-exiting surface 12, the uniformity changing element 140a may change, for example, increase the uniformity of the transmitted light. The degree of change in uniformity of light may be determined by a material which constitutes the uniformity changing element 140a. However, embodiments are not limited thereto. The uniformity of light may also be dependent on the thickness of the uniformity changing element 140a. For example, the thickness of the uniformity changing element 140 may be between about 5 mm and about 20 mm.

When a uniformity changing element separates the traveling path of light according to the polarization, a backlight unit may further include a polarization conversion element (not shown) that converts a plurality of portions of polarized light into one polarized light. The polarization conversion element may include a polarizer wave plate or the like. For example, the polarization conversion element may include a ½ wave plate, a ¼ wave plate, and the like. For example, when light is split into polarized light perpendicular to each other, a polarization conversion element including a ¼ wave plate may rotate a specific polarized light at an angle of 90 degrees.

Figure 3A:
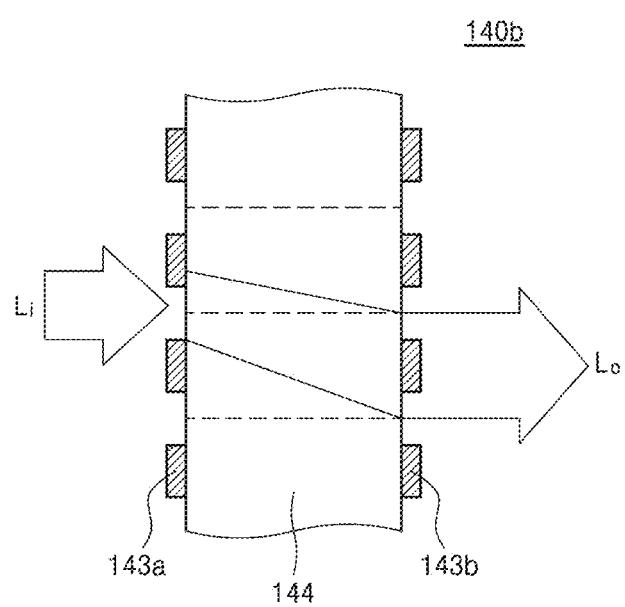
FIGS. 3A and 3B are diagrams illustrating a uniformity changing element in which a light-traveling path is changed according to an electrical signal according to an embodiment.
Figure 3B:
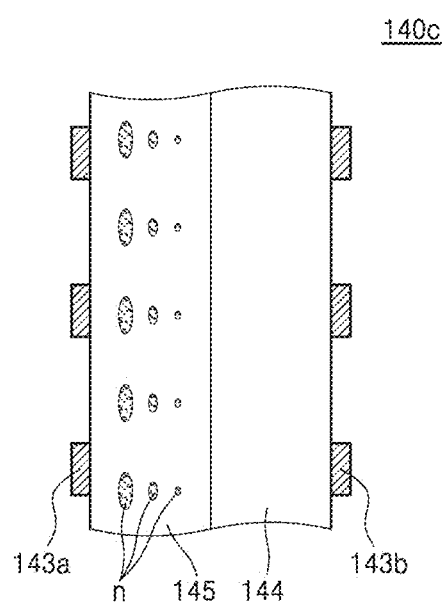

The uniformity changing element may be an element capable of adjusting a light-traveling path according to an applied electrical signal. FIGS. 3A and 3B are diagrams illustrating uniformity changing elements 140b and 140c in which a light path is changed according to an electrical signal according to an embodiment. Referring to FIG. 3A, the uniformity changing element 140b may include first electrodes 143a spaced apart from each other, second electrodes 143b arranged to face first electrodes 143a, respectively, and a liquid crystal layer 144 including liquid crystals (not shown) between the first electrodes 143a and the second electrodes 143b. According to an embodiment, the first electrodes 143a are arranged on a first side of the liquid crystal layer 144 and the second electrodes 143b are arranged on a second side of the liquid crystal layer 144 facing the first side of the liquid crystal layer 144. The refractive indices of the liquid crystals in the liquid crystal layer 144 may vary depending on an electrical signal. Thus, the uniformity changing element 140 may be divided into a plurality of regions having different refractive indices, and since the speed of the incident light $L_i$ varies depending on the refractive index of the uniformity changing element 140, the incident light $L_i$ may proceed along different traveling paths, leading to a change in the uniformity of the light and the light $L_0$ with the change in the uniformity is output.

In one or more embodiments, as illustrated in FIG. 3B, the uniformity changing element 140c may further include a geometric phase layer 145. In the geometric phase layer 145, a plurality of nonlinear materials n may form a pattern, which may change the traveling path of light according to the polarization of the incident light. The pattern of nonlinear materials may be determined by electrical signals applied to electrodes. Electrical signals applied to nonlinear materials n to form a pattern may be different from electrical signals for changing a refractive index. A first electrical signal may be applied to form a pattern in the geometric phase layer 145 and then a second electrical signal may be applied to change the refractive index of the liquid crystal layer 144. The uniformity of light may be changed by transmission of the light during when the second electrical signal is applied. In one or more embodiments, a uniformity changing element may include the geometric phase layer 145 alone. That is, the liquid crystal layer 144 may not be included. In addition, without electrodes, only a geometric phase layer having a pattern may be used as a uniformity changing element. The uniformity of the uniformity changing element may be changed by varying the thickness thereof. The uniformity changing element may include a birefringent material or a mono-refractory material.

Figure 4:
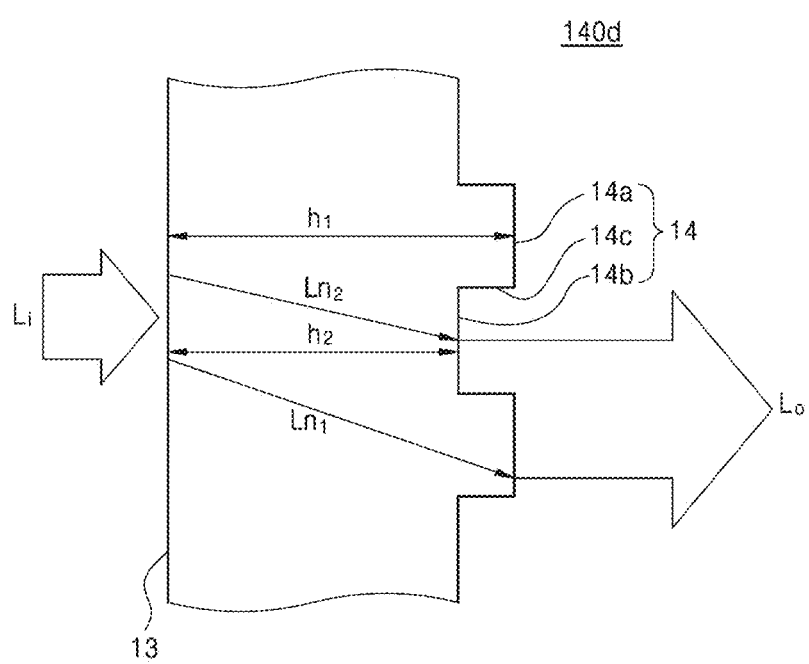
FIG. 4 is a diagram showing a uniformity changing element having a non-uniform thickness according to an embodiment.

FIG. 4 is a diagram showing a uniformity changing element 140d having a non-uniform thickness according to an embodiment. Referring to FIG. 4, the uniformity changing element 140d may have a light-exiting surface 14, and the light-exiting surface 14 may include a first sub-light-exiting surface 14a being parallel to a light-incident surface 13 and having a first height h1 with respect to the light-incident surface 13, and a second sub-light-exiting surface 14b being parallel to the light-incident surface 13 and having a second height h2 that is different from the first height h1. The difference between the first height h1 of the first sub-light-exiting surface 14a and the second height h2 of the second sub-light-exiting surface 14b may vary depending on the wavelength of the incident light. For example, the difference between the first height h1 of the first sub-light-exiting surface 14a and the second height h2 of the second sub-light-exiting surface 14b may be less than the wavelength of light. The light-exiting surface 14 may further include a third sub-light-exiting surface 14c connecting the first sub-light-exiting surface 14a with the second sub-light-exiting surface 14b and tilted at an angle with respect to the light-incident surface 13. The third sub-light-exiting surface 14c may be placed perpendicular to the light-incident surface 13.

Incident light $L_i$ entering through the light-incident surface 13 may proceed inside the uniformity changing element 140d. The first sub light $L_{n1}$, which is a portion of reflected portion of the incident light $L_i$, may be emitted through the first sub-light-exiting surface 14a, and the second sub light $L_{n2}$, which is another portion of the reflected portion of the incident light $L_i$, may further proceed inside the uniformity changing element 140 to exit through the second sub-light-exiting surface 14b. The second sub-light $L_{n2}$ may be refracted at a greater degree than the first sub-light $L_{n1}$ and proceed further to exit in the uniformity changing element 140. Thus, the distance between the first sub-light $L_{n1}$ and the second sub-light $L_{n2}$ incident on the light-incident surface 13 may be different from the distance between the first sub-light $L_{n1}$ and the second sub-light $L_{n2}$ proceeding to exit through the light-exiting surface 14, leading to a change in uniformity of light $L_o$. A light-exiting surface may include three or more sub-light-exiting surfaces of which heights with respect to a light-incident surface vary. The more light-exiting surfaces with different heights, the better the uniformity of light.

Figure 5:
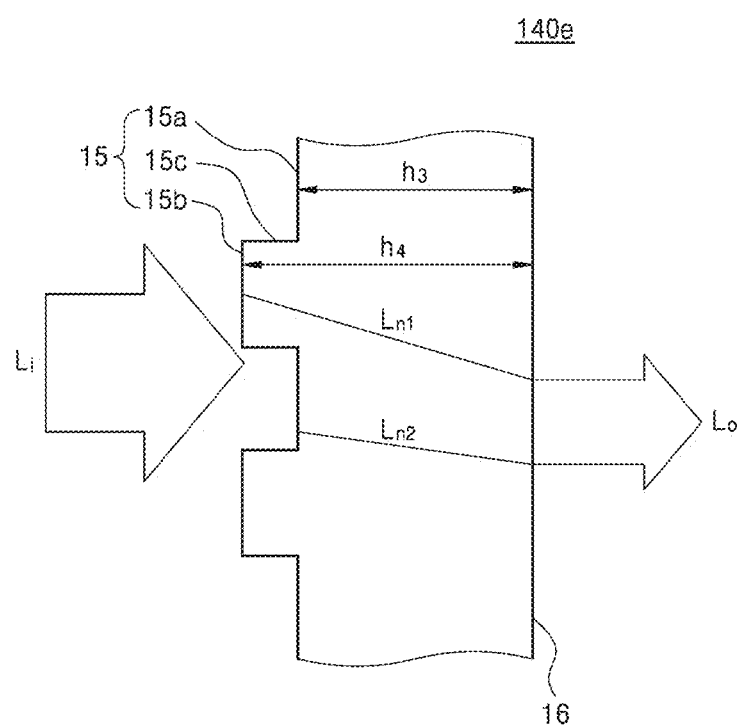
FIG. 5 is a diagram showing a uniformity changing element having a non-uniform thickness according to another embodiment.

FIG. 5 is a diagram showing a uniformity changing element 140e having a non-uniform thickness according to another embodiment. Referring to FIG. 5, a light-incident surface 15 may include a first sub-light-incident surface 15a being parallel to a light-exiting surface 16 and having a third height h3 with respect to the light-exiting surface 16, and a second sub-light-incident surface 15b being parallel to the light-exiting surface 16 and having a fourth height h4, which is different from the third height h3, with respect to the light-exiting surface 16. The difference between the third height h3 of the first sub-light-incident surface 15a and the fourth height h4 of the second sub-light-incident surface 15b may vary depending on the wavelength of incident light $L_i$. For example, the difference between the third height h3 of the first sub-light-incident surface 15a and the fourth height h4 of the second sub-light-incident surface 15b may be less than the optical wavelength. The light-incident surface 15 may further include a third sub-light-incident surface 15c connecting the first sub-light-incident surface 15a with the second sub-light-incident surface 15b and tilted at an angle with respect to the light-exiting surface 16. The third sub-light-incident surface 15c may be placed perpendicular to the light-exiting surface 16. A light-incident surface may include three or more sub-light-incident surfaces of which heights with respect to a light-exiting surface vary. The more sub-light-incident surfaces having different heights, the better the uniformity of light The incident light Li entering through the light-incident surface 15 may proceed inside the uniformity changing element 140e. The traveling distance of the first sub-light $L_{n1}$ which is refracted after being incident through the first sub-light-incident surface 15a is different from the traveling distance of the second sub-light $L_{n2}$ which is refracted after being incident through the second sub-light-incident surface 15b. Thus, the distance between the first sub-light $L_{n1}$ and the second sub-light $L_{n2}$ entering through the light-incident surface 15 is different from the distance between the first sub-light $L_{n1}$ and the second sub-light $L_{n2}$ proceeding to exit through the light-exiting surface 16, leading to a difference in the uniformity of the light $L_o$. A light-exiting surface may include three or more sub-light-exiting surfaces of which heights with respect to a light-incident surface vary. The more light-exiting surfaces with different heights, the better the uniformity of light.

Figure 6:
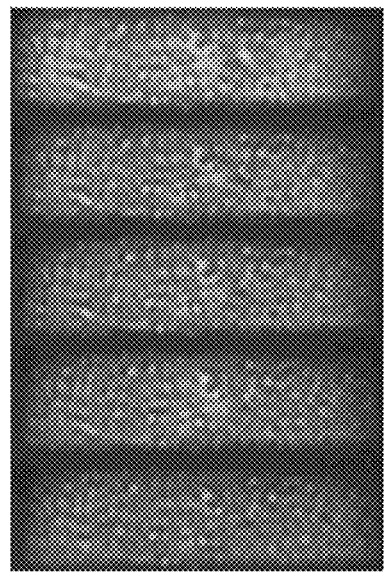
FIG. 6 shows, as a comparative embodiment, a simulation result of light emitted from a backlight unit that does not include a uniformity changing element.
Figure 7:
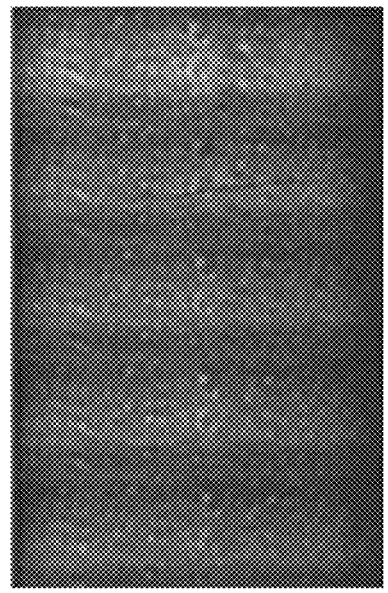
FIG. 7 shows a simulation result of light emitted from a backlight unit including a uniformity changing element according to an embodiment.

FIG. 6 shows, as a comparative embodiment, a simulation result of light emitted from a backlight unit that does not include a uniformity changing element. FIG. 7 shows a simulation result of light emitted from a backlight unit including a uniformity changing element according to an embodiment. The uniformity changing element used in an embodiment explained in connection with FIG. 7 includes a birefringent material. FIGS. 6 and 7 show that stripe patterns of a backlight unit including a uniformity changing element are unclear compared to those of a backlight unit that does not include the uniformity changing element.

Figure 8A:
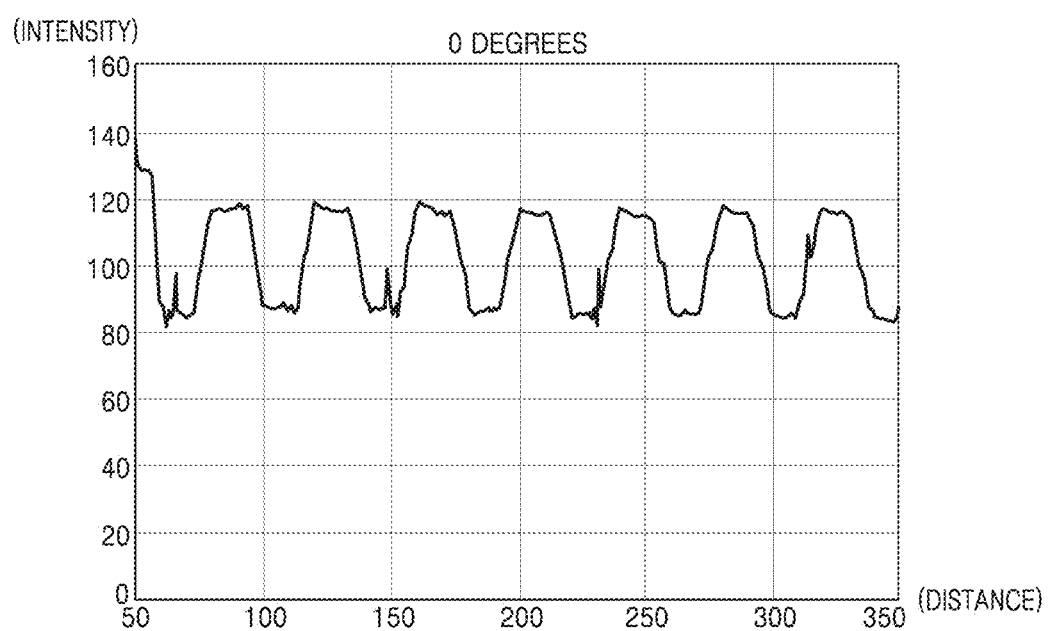
FIGS. 8A to 8C show results of simulation of uniformity according to polarization characteristics of light incident on a uniformity changing element.
Figure 8B:
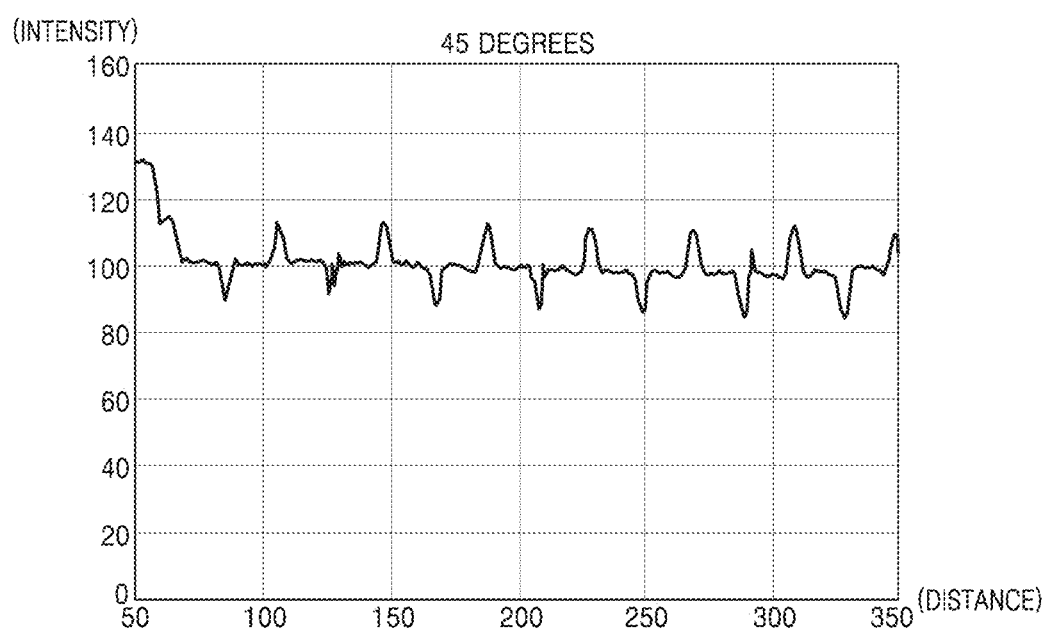
Figure 8C:
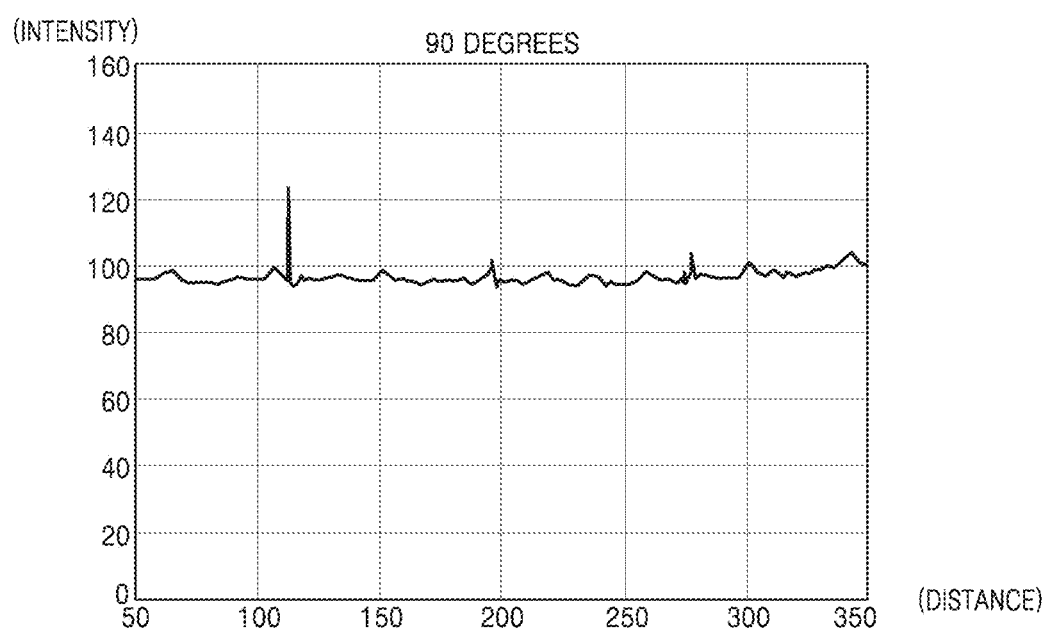

FIGS. 8A to 8C show results of simulation of uniformity according to polarization characteristics of light incident on a uniformity changing element. The embodiments use a uniformity changing element including a birefringent material. FIGS. 8A to 8C show results when the polarized light is incident at angles of 0 degrees, 45 degrees and 90 degrees, respectively. The x-axis is the distance in a direction which is perpendicular to the thickness of the uniformity changing element, that is, the distance in the longitudinal direction. When the incident light has a polarization characteristic, the uniformity changing element improves the uniformity of the light.

Figure 9:
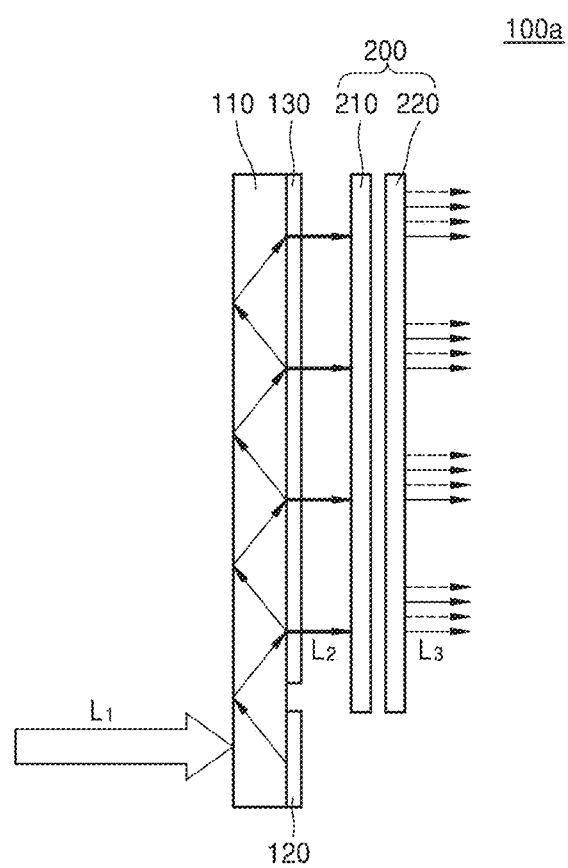
FIG. 9 shows a diagram illustrating a backlight unit according to another embodiment.

FIG. 9 shows a diagram illustrating a backlight unit 100a according to another embodiment. Unlike FIG. 1, the backlight unit 100a of FIG. 9 includes a plurality of uniformity changing elements including first and second uniformity changing elements 210 and 220. For example, a uniformity changing element 200 may include the first uniformity changing element 210 configured to change the uniformity of incident light to a first level of uniformity, and the second uniformity changing element 220 configured to change the first level of uniformity of incident light to a second level of uniformity. Each of the first uniformity changing element 210 and the second uniformity changing element 220 may be any one of the uniformity changing elements 140, 140a, 140b, 140c, 140d and 140e.

Figure 10:
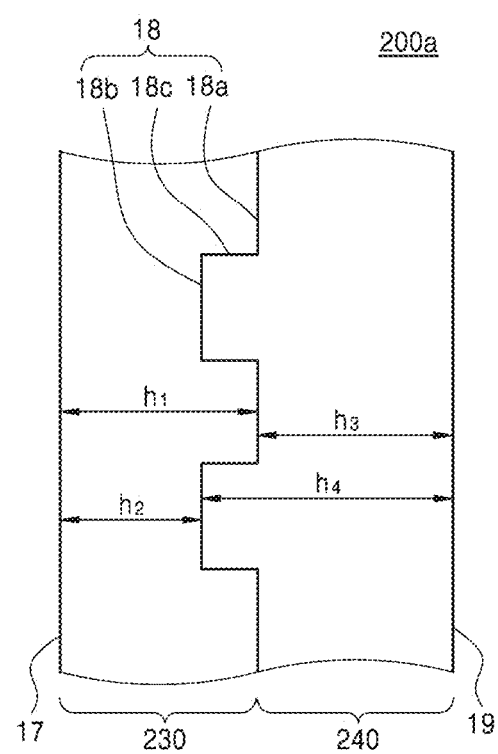
FIG. 10 is a diagram showing a plurality of uniformity changing elements according to another embodiment.

FIG. 10 is a diagram of a uniformity changing element 200a including a plurality of uniformity changing elements according to another embodiment. As shown in FIG. 10, the uniformity changing element 200a may include the first uniformity changing element 230 and the second uniformity changing element 240, wherein the thickness of the first uniformity changing element 230 is different from the thickness of the second uniformity changing element 240. Although the first uniformity changing element 230 and the second uniformity changing element 240 have different thicknesses, the sum of the thicknesses of corresponding portions of the first uniformity changing element 230 and the second uniformity changing element 240 may be constant. A light-exiting surface of the first uniformity changing element 230 may be a light-incident surface of the second uniformity changing element 240.

An interface 18 of the first uniformity changing element 230 and the second uniformity changing element 240 may have a non-uniform height with respect to a light-incident surface 17 of the first uniformity changing element 230, or the interface 18 may have a non-uniform height with respect to a light-exiting surface 19. The interface 18 has a first interface 18a having a first height h1 with respect to the light-incident surface 17 of the first uniformity changing element 230 and a third height h3 with respect to the light-exiting surface 19 of the second uniformity changing element 240 and a second interface 18b having a second height h2 with respect to the light-incident surface 17 of the first uniformity changing element 230 and a fourth height h4 with respect to the light-exiting surface 19 of the second uniformity changing element 240. The interface 18 may further include a third interface 18c inclined with respect to the light-incident surface 17 of the first uniformity changing element 230 and the light-exiting surface 19 of the second uniformity changing element 240. The third interface 18c may be perpendicular to the light-incident surface 17 of the first uniformity changing element 230 and the light-exiting surface 19 of the second uniformity changing element 240. The sum of the first height h1 and the third height h3 may be identical to the sum of the second height h2 and the fourth height h4.

Light incident on the first uniformity changing element 230 may have different transmittance distances when the light proceeds in the first uniformity changing element 230 and the distance of the second uniformity changing element 240 according to an incident site. Thus, the relative positional relationship of the incident light differs from the relative positional relationship of the emitted light, resulting in a change in uniformity of light.

Figure 11:
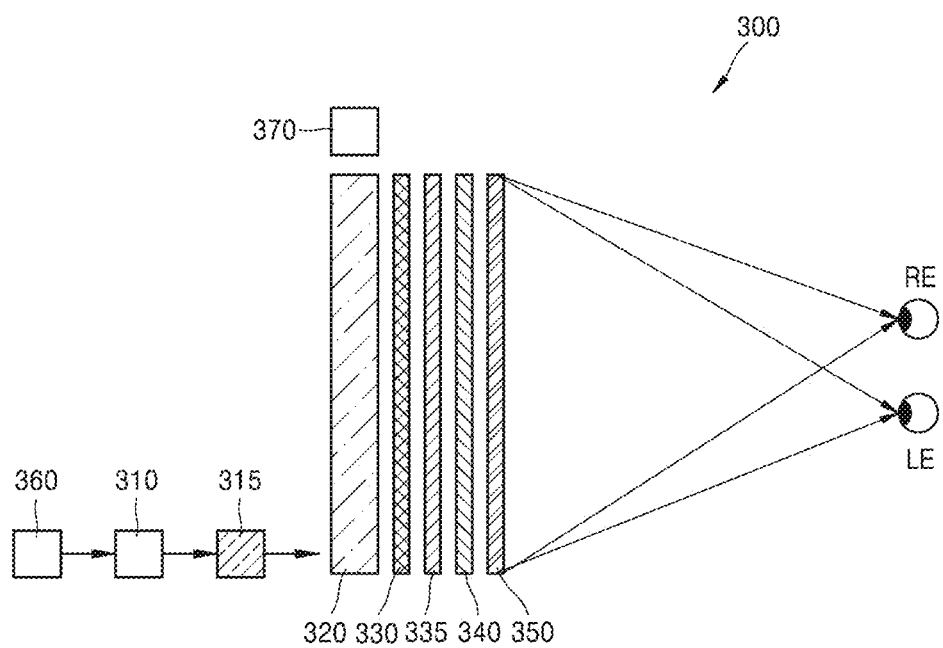
FIG. 11 illustrates a holographic display apparatus according to an embodiment.

FIG. 11 illustrates a holographic display apparatus 300 according to an embodiment.

The holographic display apparatus 300 may include a light source 310 configured to provide coherent light, a backlight unit 320 configured to change light incident into light having a different dimension, and a spatial light modulator 350 configured to diffract light emitted from the backlight unit 320 to generate a holographic image.

The light source 310 may provide coherent light. A light source may include a laser diode. However, a certain level of spatial coherence may provide coherence due to diffraction and modulation by a spatial light modulator. Accordingly, as long as light with a certain level of spatial coherence is emitted, other light sources may be available in embodiments.

The light source 310 may include a plurality of light sources that emit light of different wavelengths. For example, the light source 310 may include a first light source that emits light of a first wavelength band, a second light source that emits light of a second wavelength band, being different from the first wavelength band, and a third light source that emits light of a third wavelength band, being different from the first and second wavelength bands. The light of the first wavelength band, the light of the second wavelength band, and the light of the third wavelength band may be red light, green light, and blue light, respectively. The backlight unit 320 may include a light guide plate configured to advance light emitted by the light source 310 and a uniformity changing element configured to change the light uniformity of light incident from the light guide plate. The light guide plate and the uniformity changing element of the backlight unit 320 may be the same as described above in various embodiments, and accordingly, will not be described in detail. In the embodiment, the backlight unit 320 and the light source 310 have been separately described. However, the configuration of the backlight unit 320 and the light source 310 may not be limited thereto. A light source, a light guide plate, and a uniformity changing element may be collectively referred to as a backlight unit.

A field lens 340 configured to focus a hologram image generated by the spatial light modulator 350 on a given space may be located between the backlight unit 320 and the spatial light modulator 350. A first beam steerer 330 and a second beam steerer 335 may be provided to control the traveling direction of light emitted from the backlight unit 320 in two dimensions. The first beam steerer 330 and the second beam steerer 335 may adjust the position of emitted light according to where the viewer's pupils are located. For example, the first beam steerer 330 may adjust the lateral position of light, and the second beam steerer 335 may adjust the longitudinal position of the light. The first beam steerer 330 and the second beam steerer 335 may each be implemented as, for example, a liquid crystal layer or an electrowetting device.

Referring to FIG. 11, the position of the field lens 340 is illustrated as being located between the second beam steerer 335 and the spatial light modulator 350, but is not limited thereto. In one or more embodiments, the field lens 340 may be located in front of the spatial light modulator 350, i.e., the field lens 340 may be located after the spatial light modulator 350 in a direction of the light propagating path.

A beam expander 315 may be further provided between the light source 310 and the backlight unit 320. The beam expander 315 may primarily expand light by collimating spot light from the light source 310. The beam expander 315 may include, for example, a collimating lens. As the divergence angle of the light is made closer to 0 degree by collimating the light, the coherence of the light may be enhanced. Thus, due to the collimating by the beam expander 315, light may provide a high quality of the holographic image.

The holographic display apparatus 300 may further include an eye tracking sensor 370 configured to recognize the position of a viewer, and a processor 360 configured to control the first beam steerer 330 and the second beam steerer 335 according to positions sensed by the eye tracking sensor 370. The eye tracking sensor 370 may include an infrared camera, a visible light camera, or various other sensors.

The processor 360 may also control the operation of the light source 310. For example, the processor 360 may control the irradiation direction of light in a time sequential manner in such a way that a holographic image is formed on the left and right eyes of the viewer in a time sequential manner.

The holographic display apparatus 300 according to the embodiment may provide hologram images with different viewpoints to a left eye LE and a right eye RE of the viewer in a binocular hologram manner. For example, the holographic display apparatus 300 provides a holographic image for a left eye to the view area of the left eye LE of the viewer and a holographic image for a right eye to the view area of the right eye RE of the viewer. Unlike the left-eye image and the right-eye image according to a stereoscopic method, the left-eye hologram image and the right-eye hologram image provided by the holographic display apparatus 300 may each provide a stereoscopic effect to the viewer. The only difference between the left-eye hologram image and the right-eye hologram image is a viewpoint. In the stereoscopic method, three dimensions are provided by using a binocular disparity when a two-dimensional image for the left eye and a two-dimensional image for the right eye are recognized in the left and right eyes of the viewer, respectively. Therefore, in the stereoscopic method, neither the left eye image nor the right eye image produces a stereoscopic effect, and the depth perceived by the brain does not match with the focus of the eye, so that the viewer may feel fatigue. On the other hand, the holographic display apparatus 300 forms a left-eye hologram image and a right-eye hologram image in a spatial position, that is, in a left eye (LE) view area and a right eye (RE) view area of the viewer, the depth perceived by the brain matches with the focus of the eye, and the full parallax may be provided. The holographic display apparatus 300 according to the embodiment provides only a binocular viewpoint. This is because the viewer recognizes only two viewpoints with the left eye LE and the right eye RE and thus, only viewpoint information, which is recognizable by the viewer, is used and the other information is removed, thereby reducing data throughput. However, a holographic display apparatus according to various embodiments may provide more viewpoints.

In one or more embodiments, the first beam steerer 330 and the second beam steerer 335 may control the focusing position of the hologram image. In other words, the first beam steerer 330 and the second beam steerer 335 may control the left-eye position where the left-eye hologram image is focused and the right-eye position where the right-eye hologram image is focused. The unique interval of the left eye and right eye of each viewer may be sensed by the eye tracking sensor 370 and a change in the position of the left eye and the position of the right eye due to the motion of the viewer may be detected may be sensed. According to the sensed information, the first beam steerer 330 and the second beam steerer 335 may control the traveling direction of the light.

Any one of the first beam steerer and the second beam steerer 335 may be a liquid crystal deflector that diffracts incident light to produce two light that proceeds at different angles. When one of the first beam steerer 330 and the second beam steerer 335 spatially separates the light to face the left eye and the right eye at the same time, the time sequence driving of the light source 310 may not be performed.

The field lens 340 may focus light, of which traveling direction has been controlled by the first beam steerer 330 and the second beam steerer 335, on a given space. The field lens 340 may include a Fresnel lens, a liquid crystal lens, and a holographic optical element.

The light, of which traveling direction has been controlled by the first beam steerer 330 and the second beam steerer 335, is incident on the spatial light modulator 350 through the field lens 340. The spatial light modulator 350 may form a hologram pattern having interference fringes for modulating incident light. By the hologram pattern formed in the spatial light modulator 350, the incident light is diffracted and modulated. Therefore, a hologram image may be reproduced at a predetermined spatial position.

A holographic display apparatus according to an embodiment may be applied to, for example, a mobile phone. When a user views the screen of the mobile phone by using the eye tracking sensor 370 and a beam steerer, the three-dimensional image may be displayed according to the position of the eye by tracking the movement of the position of the viewer's eye.

Figure 12:
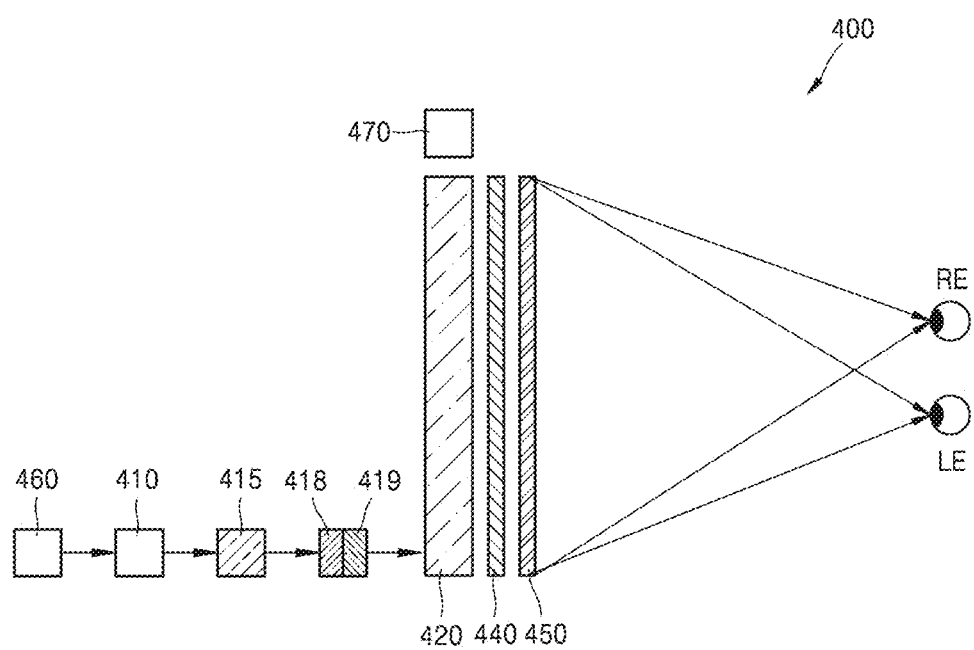
FIG. 12 illustrates a holographic display apparatus according to another embodiment.

FIG. 12 shows a holographic display apparatus 400 according to another embodiment.

The holographic display apparatus 400 may include a light source 410 configured to provide coherent light, a backlight unit 420 configured to change light incident into light having a different dimension, and a spatial light modulator 450 configured to diffract light emitted from the backlight unit 420 to reproduce a holographic image. The light source 410 may provide coherent light. The backlight unit 420 is the same as described above, and a detailed description thereof will be omitted here. The backlight unit 420 and the light source 410 have been separately described, but embodiments are not limited thereto. A light source, a light guide plate, and a uniformity changing element may be collectively referred to as a backlight unit.

A field lens 440 configured to focus a hologram image reproduced by the spatial light modulator 450 on a given space may be located between the backlight unit 420 and the spatial light modulator 450.

A beam expander 415 may further be provided between the light source 410 and a light guide plate. The beam expander 415 may expand light by collimating spot light from the light source 410.

A first beam steerer 418 and a second beam steerer 419 may be further provided between the light source 410 and the backlight unit 420 to control the traveling direction of the light two-dimensionally. The first beam steerer 418 and the second beam steerer 419 may adjust the position of emitted light according to the position of the viewer's pupil. For example, the first beam steerer 418 may adjust the lateral position of light, and the second beam steerer 419 may adjust the longitudinal position of the light.

The holographic display apparatus 400 may further include an eye tracking sensor 470 configured to recognize the position of a viewer, and a processor 460 configured to control the first beam steerer 418 and the second beam steerer 419 according to positions sensed by the eye tracking sensor 470.

The processor 460 may also control the operation of the light source 410. For example, the processor 460 may control the irradiation direction of the light in a time sequential manner such that a hologram image is formed on the left and right eyes of the viewer in a time sequential manner.

Referring to FIGS. 11 and 12, beam steerers are provided at different positions, and the components having the same name perform substantially the same functions and operations, so that detailed description thereof will be omitted here.

A backlight unit according to an embodiment may be applied to a holographic display, a mobile phone, a 3D TV, and the like. In a holographic display apparatus according to an embodiment, the uniformity of light is improved by a backlight unit and the banding may be reduced.

The above-described backlight unit for a holographic display apparatus and a holographic display apparatus including the same have been described with reference to the embodiments explained in connection with the drawings. However, these embodiments are provided for illustrative purpose, and it will be understood by those skilled in the art that various changes and modifications may be made on the embodiments. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A backlight unit comprising:
   a light guide plate;
   an input coupler configured to input light into the light guide plate;
   an output coupler configured to output the light that has traveled in the light guide plate; and
   a uniformity changing element having a light-incident surface and a light-exiting surface, and configured to receive the light output from the light guide plate through the light-incident surface; change uniformity of the received light from the light guide plate and output the received light with the change in the uniformity of the received light through the light-exiting surface,
   wherein the uniformity changing element comprises:
      a first uniformity changing element configured to change uniformity of the light into a first level of uniformity and output light having the first level of uniformity; and
      a second uniformity changing element configured to change the first level of uniformity of the light into a second level of uniformity and output light having the second level of uniformity, the first level of uniformity being different from the second level of uniformity.

2. The backlight unit of claim 1, wherein the uniformity changing element is further configured to increase the uniformity of the light.

3. The backlight unit of claim 1, wherein the uniformity changing element is further configured to output the light incident on a first location on the light-incident surface through a plurality of different second locations on the light-exiting surface.

4. The backlight unit of claim 3, wherein the uniformity changing element is further configured to propagate the light along a plurality of different light-traveling paths according to polarization of the light inside the uniformity changing element.

5. The backlight unit of claim 4, wherein the uniformity changing element is further configured to change the plurality of different light-traveling paths according to an applied electrical signal.

6. The backlight unit of claim 5, wherein the uniformity changing element comprises:
   at least one liquid crystal layer;
   first electrodes spaced apart from each other and arranged on a first side of the at least one liquid crystal layer; and
   second electrodes arranged on a second side of the at least one liquid crystal layer and respectively facing the first electrodes, wherein the at least one liquid crystal layer is between the first electrodes and the second electrodes, and wherein the liquid crystal layer comprises liquid crystals whose refractive index changes according to an electrical signal applied to the corresponding first and second electrodes; and a non-linear material whose pattern changes according to the applied electrical signal.

7. The backlight unit of claim 3, wherein the uniformity changing element comprises a birefringent material.

8. The backlight unit of claim 1, wherein the backlight unit further comprises a polarization conversion element configured to convert a plurality of portions of polarized light into single polarized light when the light output from the uniformity changing element comprises the plurality of portions of polarized light.

9. The backlight unit of claim 1, wherein the uniformity changing element has a non-uniform thickness.

10. The backlight unit of claim 9, wherein the light-exiting surface comprises:
 a first sub-light-exiting surface being parallel to the light-incident surface and having a first height with respect to the light-incident surface;
 a second sub-light-exiting surface being parallel to the light-incident surface and having a second height with respect to the light-incident surface, the second height being different from the first height; and
 a third sub-light-exiting surface connecting the first sub-light-exiting surface with the second sub-light-exiting surface and tilted at an angle with respect to the light-incident surface.

11. The backlight unit of claim 10, wherein the uniformity changing element is further configured to propagate a portion of the light through the first sub-light-exiting surface, and at least a portion of the remainder of the light through the second sub-light-exiting surface.

12. The backlight unit of claim 10, wherein the third sub-light-exiting surface is perpendicular to the light-incident surface.

13. The backlight unit of claim 9, wherein the light-incident surface comprises:
 a first sub-light-incident surface being parallel to the light-exiting surface and having a third height with respect to the light-exiting surface;
 a second sub-light-incident surface being parallel to the light-exiting surface and having a fourth height with respect to the light-exiting surface, the fourth height being different from the third height; and
 a third light-incident surface connecting the first sub-light-incident surface with the second sub-light-incident surface and tiled at an angle with respect to the light-exiting surface.

14. The backlight unit of claim 13, wherein a portion of the light is incident on and passes through the first sub-light-incident surface, and at least a portion of the remainder of the light is incident on and passes through the second sub-light-incident surface.

15. The backlight unit of claim 1, wherein light incident on the input coupler is coherent.

16. The backlight unit of claim 1, wherein when the light incident on the input coupler is spot light, the output coupler outputs line light.

17. The backlight unit of claim 1, wherein a thickness of the first uniform changing element is different from a thickness of the second uniform changing element.

18. The backlight unit of claim 1, wherein a light-exiting surface of the first uniformity changing element is a light-incident surface of the second uniformity changing element.

19. A holographic display apparatus comprising:
 a light source configured to emit light;
 a light guide plate configured to propagate the light from the light source and output the propagated light outside of the light guide plate;
 a uniformity changing element configured to receive the light output from the light guide plate; change uniformity of light received from the light guide plate and output the received light with the change in the uniformity of the received light; and
 a spatial light modulator comprising a light-incident surface and a light-exiting surface facing the light-incident surface and configured to diffract light output from the uniformity changing element to generate a holographic image,
 wherein the uniformity changing element comprises:
  a first uniformity changing element configured to change uniformity of the light into a first level of uniformity and output light having the first level of uniformity; and
  a second uniformity changing element configured to change the first level of uniformity of the light into a second level of uniformity and output light having the second level of uniformity, the first level of uniformity being different from the second level of uniformity.

20. The holographic display apparatus of claim 19, wherein
 the uniformity changing element is configured to output the light incident on a first location of the light-incident surface through a plurality of different second locations on the light-exiting surface.

21. The holographic display apparatus of claim 19, wherein
 the uniformity changing element has a non-uniform thickness.

22. A backlight unit comprising:
 a light guide plate configured to guide light from a light source;
 an output coupler configured to output the light propagated through the light guide plate; and
 a uniformity changing element configured to receive the light output from the output coupler; change uniformity of the received light from the output coupler by changing a propagation direction of the received light; and output the received light with the change in the uniformity of the received light,
 wherein the uniformity changing element comprises:
  a first uniformity changing element configured to change uniformity of the light into a first level of uniformity and output light having the first level of uniformity; and
  a second uniformity changing element configured to change the first level of uniformity of the light into a second level of uniformity and output light having the second level of uniformity, the first level of uniformity being different from the second level of uniformity.

23. The backlight unit of claim 22, wherein the uniformity changing element is configured to change a propagation direction of the received light by separating the received light into two or more light refracted light based on polarization characteristics.

* * * * *